(12) United States Patent
Li et al.

(10) Patent No.: US 8,415,855 B2
(45) Date of Patent: Apr. 9, 2013

(54) BRUSHLESS MOTOR

(75) Inventors: Yong Bin Li, Hong Kong (CN); Wei Feng Yuan, Hong Kong (CN); Ning Sun, Shenzhen (CN); Xin Ping Wang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 529 days.

(21) Appl. No.: 12/553,503

(22) Filed: Sep. 3, 2009

(65) Prior Publication Data
US 2010/0054971 A1    Mar. 4, 2010

(30) Foreign Application Priority Data

Sep. 3, 2008   (CN) .......................... 2008 1 0141852

(51) Int. Cl.
*H02K 1/14*     (2006.01)
*H02K 3/28*     (2006.01)

(52) U.S. Cl.
USPC ...... 310/216.074; 310/216.088; 310/216.069; 310/216.104; 310/58; 310/59

(58) Field of Classification Search ........... 310/216.001, 310/216.004, 216.055, 216.056, 216.066, 310/216.067, 216.119, 216.013, 216.014, 310/216.057, 216.074, 216.069, 216.088, 310/58–59, 49 R
See application file for complete search history.

(56) References Cited

U.S. PATENT DOCUMENTS

| | | | | |
|---|---|---|---|---|
| 4,672,253 A * | 6/1987 | Tajima et al. | .................. | 310/269 |
| 5,874,795 A * | 2/1999 | Sakamoto | ................ | 310/156.12 |
| 6,952,064 B2 * | 10/2005 | Hiwaki et al. | ................. | 310/214 |
| 7,247,967 B2 * | 7/2007 | Ionel et al. | ............. | 310/216.086 |
| 8,102,093 B2 * | 1/2012 | Prudham | ................ | 310/216.071 |
| 2006/0066159 A1 * | 3/2006 | Enomoto et al. | ................. | 310/54 |

FOREIGN PATENT DOCUMENTS

WO    WO 2007113436 A1 * 10/2007

\* cited by examiner

*Primary Examiner* — Tran Nguyen
*Assistant Examiner* — Leda Pham
(74) *Attorney, Agent, or Firm* — Muncy, Geissler, Olds & Lowe, PLLC (57) ABSTRACT

A brushless direct current (BLDC) motor has a 3-phase winding 20 and six stator teeth 14, 15 with alternate stator teeth 14 being wound and the remaining stator teeth 15 being left unwound. The winding 20 has three legs, one for each phase and each leg has one coil 22 wound about one of the stator teeth 14. Each leg has a first end A,B,C, arranged to receive electrical power and a second end X,Y,Z, which is connected to the second end of the other legs to form a star connection 24. Selected stator teeth have grooves in a face thereof dividing those teeth into a plurality of stator poles. The motor may be used to drive a fuel pump for an internal combustion engine, typically for a vehicle.

13 Claims, 6 Drawing Sheets

BRUSHLESS MOTOR

CROSS REFERENCE TO RELATED APPLICATIONS

This non-provisional patent application claims priority under 35 U.S.C. §119(a) from Patent Application No. 200810141852.7 filed in The People's Republic of China on Sep. 3, 2008.

FIELD OF THE INVENTION

This invention relates to a brushless motor and in particular, to a fuel pump having a brushless motor, especially a brushless direct current (BLDC) motor.

BACKGROUND OF THE INVENTION

Fuel pumps are used in motor vehicles to transfer liquid fuel, typically gasoline or diesel from a fuel tank to an internal combustion engine. The pump is driven by a small DC motor and to minimize fuel leakage through bearing seals etc, the fuel passes through the interior of the motor. This works very well even with motors having commutators, with the fuel cooling the motor and eliminating sparking between the brushes and the commutator. However, with the advent of high alcohol fuels, chemical reactions between the commutator and the fuel has become problematic leading to the use of graphite commutators and renewed interest in brushless motors to drive the fuel pumps. There are many advantages of brushless motors, especially in automobile applications, such as longer life by eliminating the use of brushes and a commutator. Typically, the brushless motor may be a single phase motor or a three phase motor. Traditionally, these motor have been termed as brushless direct current motors or BLDC motors for short as often the input power to the motor controller is DC power, typically from a battery or rectified AC supply. However, recently the term brushless AC motor or BLAC motor has been coined. This motor is a special type of BLDC motor in which the controller sends power to the motor in the form of a sinusoidal wave instead of a pulse or square wave. However, many people still use the term BLDC to include both types of motors as the difference is in the type of controller. That said, certain modifications are usually made to make the brushless motor more efficient with one or the other type of controller. For the sake of simplicity, we will refer to both types of brushless motors by the generic term BLDC motor or simply as a brushless motor.

Figure 1:
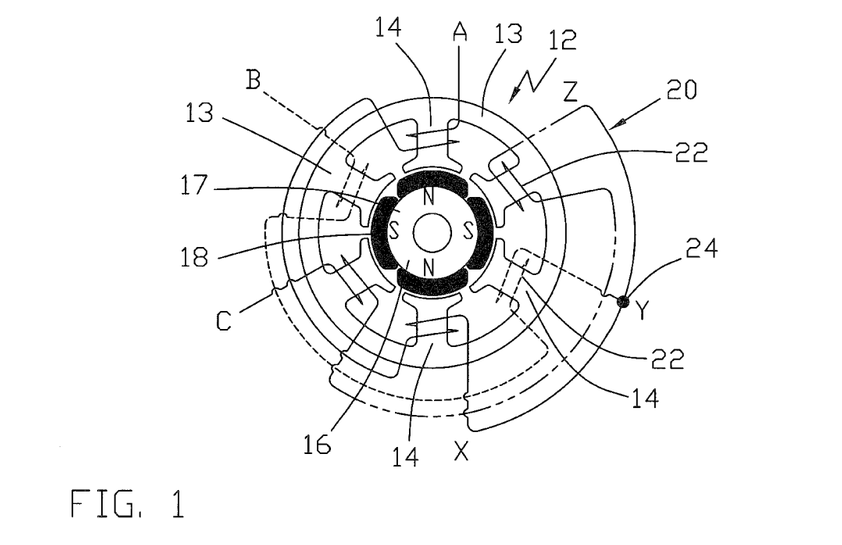
FIG. 1 is a wiring diagram for the stator of a prior art 3-phase, 6 slot, 4 pole BLDC motor.

For existing three phase, 4-pole BLDC motors available in the marketplace, including outer rotor and inner rotor models, 6 slots is its most popular and simplest stator lamination structure in the low power applications. FIG. 1 illustrates a prior art schematic winding diagram for a 3-phase BLDC motor. The stator 12 has a stator core 13 with six stator poles 14, referred to as slots. The rotor 16 has four magnetic poles 18 formed by four permanent magnets fixed to the outer surface of a rotor core 17 (in known manner). The winding 20 forms a coil 22 about each stator pole 14. The winding 20 is a 3-phase star winding, meaning that the winding 20 has three legs or phases, with one end (A,B,C) of each leg being connected to the stator terminals (one for each phase) and the other end (X,Y,Z) of each leg being connected together at point 24 to form a star connection. Hence the motor is referred to as a three phase, four pole, six slot BLDC motor. In this geometry there are six coils, two coils for each phase. Thus each leg has two coils 22 electrically connected in series. This is difficult to wind in small diameter motors.

The main problem with the existing stator geometry is that the winding configuration is complicated for small diameter, lower power applications, such as the automotive fuel pump, water pump and air pump, etc. In these applications, the stator inner diameter is very small, just around 20 mm, therefore it is difficult to assemble more coils, especially for mass production.

Figure 2:
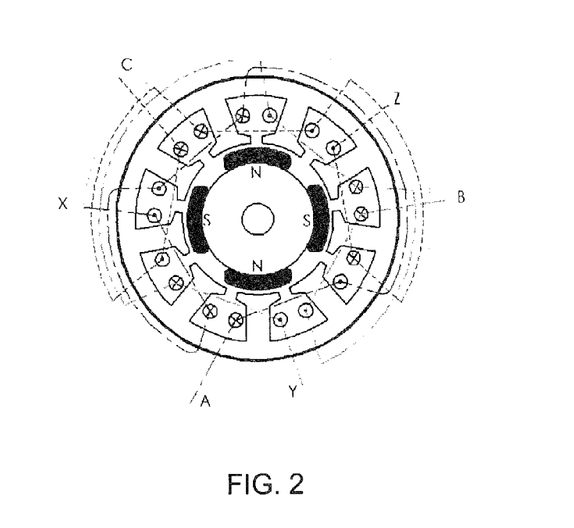
FIG. 2 is a wiring diagram for the stator of a prior art 3-phase, 9 slot, 4 pole BLDC motor.

Another problem with existing products is the high cogging torque, which creates noise and vibration. This has restricted the use of BLDC motors in many fields which need low noise and low vibration. In order to solve this problem, one of the most effective methods is the 4 pole, 9 slot configuration, as shown in FIG. 2. From this figure we can see that the winding becomes even more complicated with three coils per phase and a lower efficiency caused by longer winding end-turns.

Another problem with existing products is that it is not suitable for overmold technology in the fuel pump application. As diverse fuels will be used in the future, such as alcohol containing fuels, etc, to avoid oxidation of the magnetic wire, overmold is desired. However, this results in the stator becoming a solid body, i.e., there is no space for fuel to pass through, except through the air gap between the rotor and the stator. However, to maintain motor efficiency, the air gap is very small with the result that the fuel flow is insufficient.

SUMMARY OF THE INVENTION

Hence there is a desire for a brushless direct current (BLDC) motor which has a simple winding structure with low cogging torque.

This is achieved in the present invention by using a multiple phase stator (i.e. 2, 3 or more phases) with only a single coil for each phase.

Accordingly, in one aspect thereof, the present invention provides a brushless direct current motor comprising: a rotor having 2*m permanent magnet rotor poles, where m is an integer; and a stator having 2*n stator teeth and an n-phase stator winding with each leg of the stator winding having a single coil wound about a respective one of the stator teeth, where n is an integer greater than 1, wherein the stator teeth form wound teeth having a coil there on and unwound teeth having no coil, wherein the wound teeth are alternately spaced with the unwound teeth, and each wound tooth or each unwound tooth or each stator tooth, has at least one axially extending groove formed in a face thereof dividing each said tooth into a plurality of stator poles.

Preferably, each wound tooth forms two stator poles and each unwound tooth forms one stator pole.

Alternatively, each wound tooth forms three stator poles.

Preferably, each unwound tooth forms two stator poles.

Preferably, the stator has a core formed from a stack of laminations and the core has a radially outer surface having a number of recesses extending axially of the core.

Preferably, the recesses are circumferentially aligned with selected stator teeth.

Preferably, there are n recesses, each aligned with a respective one of the unwound teeth.

Preferably, the stator core has a stator ring and a number of separately formed stator plugs fixed thereto, each plug forming a wound tooth.

Preferably, the stator winding of the motor is encased in a resin material.

Preferably, the stator of the motor is overmolded with a plastics material.

According to a second aspect thereof, the present invention provides a fuel pump for an internal combustion engine, incorporating a motor as described above.

Preferably, the fuel pump has a housing accommodating a pump and the motor, the motor being arranged to drive the pump to cause fuel to flow through the housing, and at least one passage for the flow of fuel is formed between the stator and the housing.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 3:
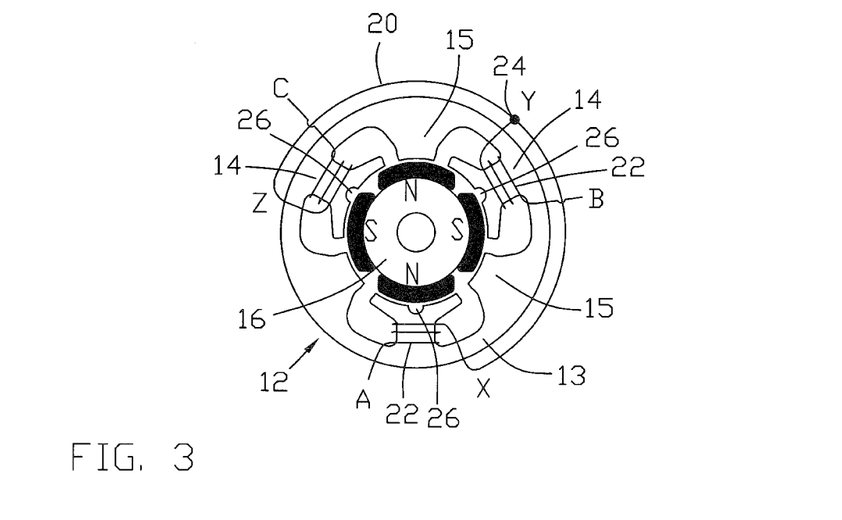
FIG. 3 is a wiring diagram for the stator of a 3-phase, 9 slot, 4 pole BLDC motor according to a first embodiment of the present invention.

FIG. 3 is a schematic winding diagram for a 3-phase BLDC motor for a first preferred embodiment. The stator 12 has a stator core 13 with six teeth 14, 15 forming the stator poles as will be described later. The winding 20 has only three coils 22 formed about alternate teeth 14. The winding 20 is a 3-phase star winding having three legs, one leg for each phase, with one end A,B,C, of each leg being connected to the stator terminals (one for each phase) and the other end X,Y,Z, of each leg being connected together at 24 to form a star connection. Thus each leg has only one coil 22. This is easier to wind especially in small diameter motors. However, the wound teeth 14 have a larger circumferential extent than the unwound teeth 15 and have a deep groove 26 in the pole face which extends axially for the length of the tooth 14 and radially outwardly into the tooth, dividing the pole face into two, preferably equal, portions. The groove 26 has the effect of dividing the tooth 14 into two stator poles and forming a dummy slot. Thus the stator effectively has 9 slots or 9 stator poles. The grooves 26 are referred to as dummy slots as no coils are would into the dummy slots. Thus the stator has a simple winding, more simple than the winding of the motor of FIG. 1 or FIG. 2.

Figure 4:
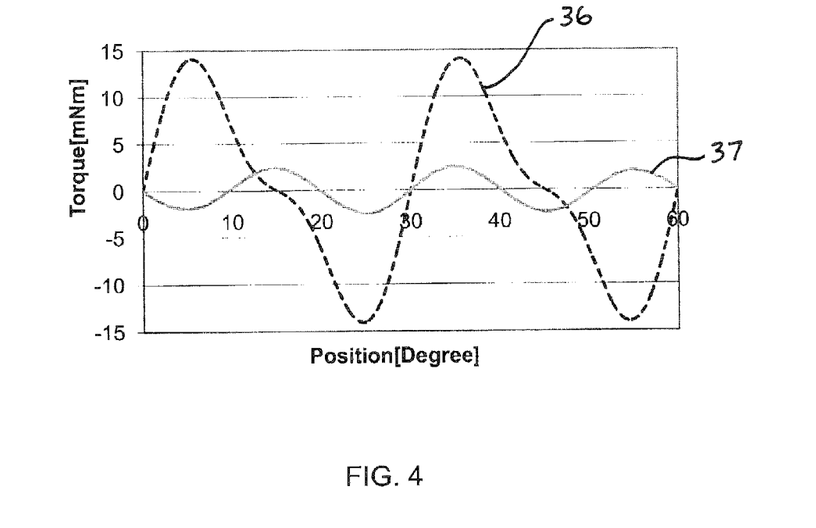
FIG. 4 is a diagram showing a comparison of cogging torque between a typical prior art 3-phase, 6 slot, 4 pole BLDC motor and a size comparable 3-phase, 9 slot, 4 pole BLDC motor according to an embodiment of the present invention.

FIG. 4 shows a comparison between the cogging torque of the motor of FIG. 3 and a comparably sized motor according to FIG. 1. Curve 56 represents the cogging torque for the prior art motor and curve 37 represents the cogging torque of the motor of the preferred embodiment. As can be seen the cogging torque has been reduced from about 14 mNm to about 2.5 mNm, a reduction of about 80%, and a decrease in the angular displacement per cycle from 30° to 20°, which has the effect of further smoothing the rotation of the rotor. This confirms that the stator is operating as a 9 slot motor.

Figure 5:
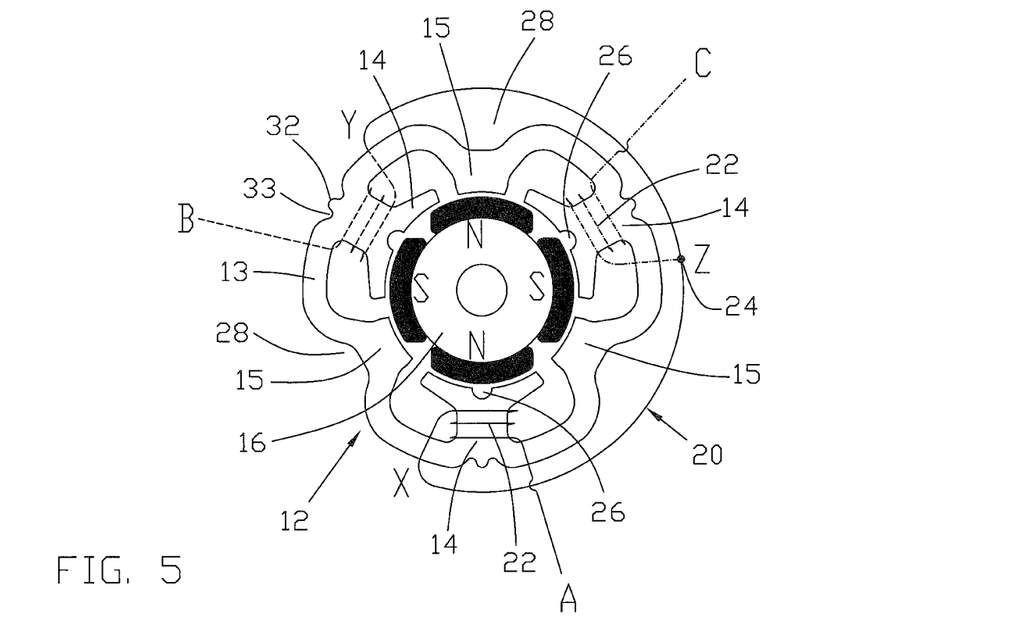
FIG. 5 is a wiring diagram, similar to FIG. 3, for a modified stator according to a second embodiment of the present invention.

FIG. 5 is a schematic winding diagram for a 3-phase BLDC motor for a second preferred embodiment. The wiring diagram also shows the shape of the stator core. The stator 12 has a similar construction to that of FIG. 3 with the exception that the radially outer surface of the stator core 13 has a number of axially extending recesses 28. Recesses 28 form passages, between the stator core 13 and the housing 42 in which the stator core 13 is fixed. In a fuel pump application, fuel can flow can flow through these passages, greatly reducing the resistance of the fuel path through the motor and thus reducing the energy required to pump the fuel through the motor. The recesses 28 are shown aligned with the non-wound teeth 15. This is thought to have no negative impact on the magnetic circuit of the stator while allowing maximum space for the coils 22 formed on the wound teeth 14.

Figure 6:
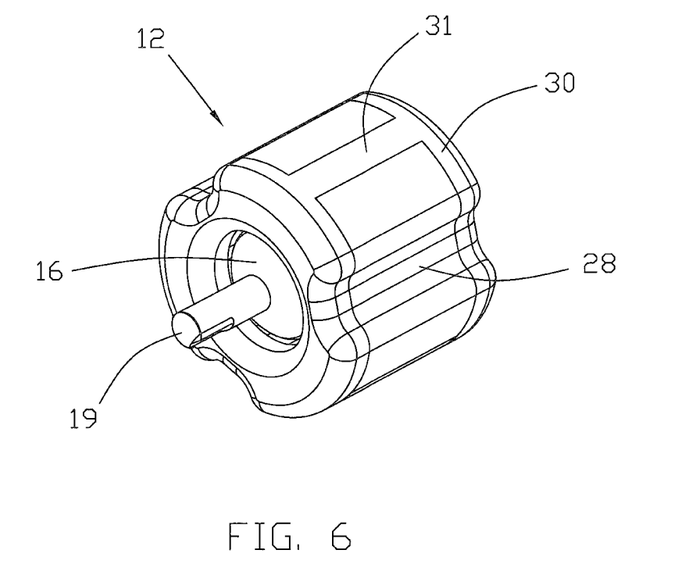
FIG. 6 is a perspective view of the stator of FIG. 5.

The completed stator 12 and rotor 16 set is illustrated in FIG. 6. After plating the stator core 13 to increase resistance to corrosion, the stator 12 is over molded with a plastics material or resin material 30, preferably by an insert molding operation. The pole faces and the radially outer surface of the stator core 13 is not covered with the over mould material. This ensures a good transfer of magnetic flux between the pole faces of the stator and the rotor and also allows a good fit with the motor housing in which the stator core is preferably a press fit. The laminations of the stator core 13 may be held together by welding. This is preferably done by welding together a small nub 32 formed for this purpose in a cut-out 33 in the outer surface of the stator core aligned with the wound teeth 14, shown in FIG. 5. During over molding, this cut-out 33 is filled with mould material to protect the weld. This over mould material forms the strip 31, which can be seen in FIG. 6 on the outer surface of the stator core connecting the ends of the stator.

The windings may be connected to stator terminals for connection to a controller or directly to motor terminals and where used the terminals would also have exposed parts (not shown) not covered by the over molding for making further electrical connections. The rotor core 17 is also shown as being over molded to protect the rotor core from the fuel. The over mould material 30 also helps the efficiency of the fuel pump by making a smooth path for the flow of the fuel and by smoothing the outer surface of the rotor to reduce windage, the resistance created by rotating a non-smooth surface or body having salient features.

Figure 7:
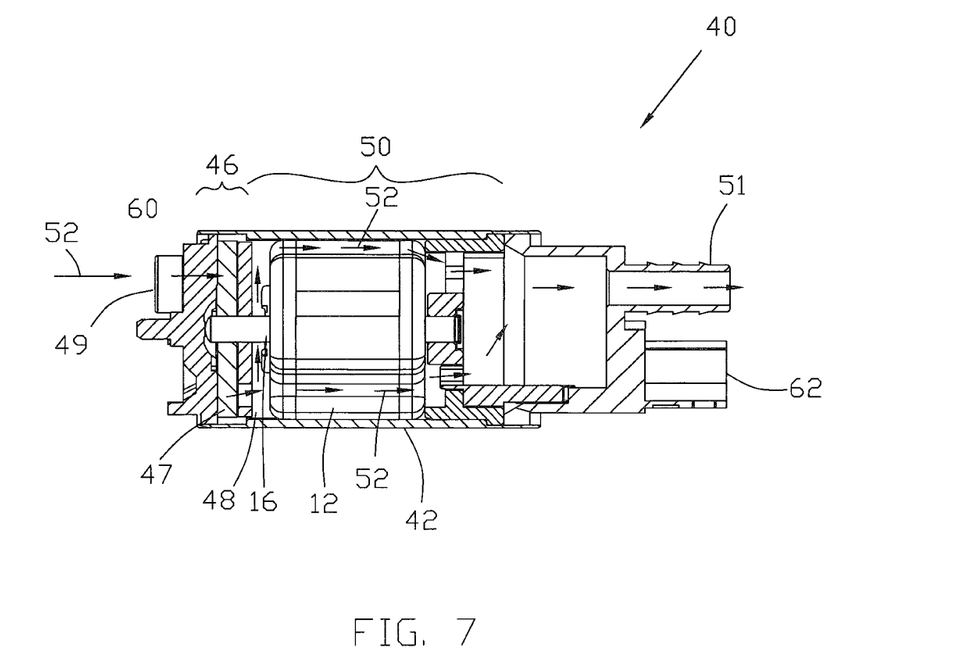
FIG. 7 is a sectional view of a fuel pump, incorporating the stator of FIG. 6.

FIG. 7 illustrates a complete fuel pump 40 in sectional view. The fuel pump has a housing 42 of cylindrical form with two open ends which are sealed by end caps 44, 45 which connect the fuel pump to the fuel lines. The housing accommodates a pump section 46 and a motor section 50. The pump section 46 includes an impeller 47 arranged to be rotated by the motor within a volute 48 to draw fuel into the pump section from a fuel inlet 49 in the first end cap 44 and force the fuel through the motor section 50 and out a fuel outlet 51 in the second end cap 45. The motor section 50 houses the motor which includes the stator 12 which is pressed into the housing 42, and the rotor 16 with the rotor core 17 located within the stator 12 and a rotor shaft 19 which is journalled in bearings in the pump volute 48 at one end and in the second end cap 45 at the other end. The second end cap is shown being of two parts, a first part sealing the housing and forming the fuel outlet and also the connector for the electrical power to operate the motor, and a second part supporting the bearing for the rotor shaft. The motor section 50 may include an electronics module to accommodate the electronics for operating the BLDC motor; however, in this embodiment the electronics module is either not shown or not mounted inside the fuel pump.

The fuel flow path of the pump is in through the inlet 49 in the first end cap 44, into the pump volute 48, where it is pumped out by the impeller 47 into the interior of the housing 42, passed the motor by passing through the gap between the rotor core 17 and the stator core 13 or through the passages 52 formed between the recesses 28 in the stator core 13 and the housing 42, into the second end cap 45 and out of the pump though the outlet 51 of the second end cap 45, as illustrated in FIG. 7 by block arrows 60.

Figure 8:
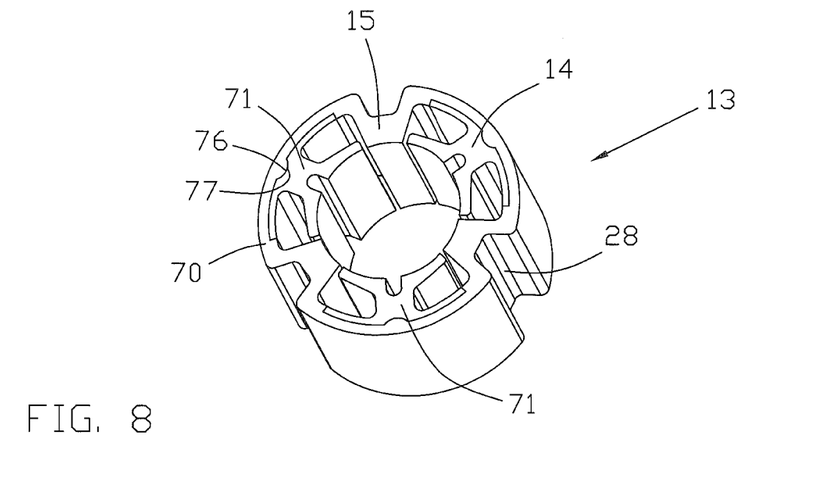
FIG. 8 is a perspective view of an assembled stator core for a 9 slot stator according to another embodiment of the present invention.
Figure 9:
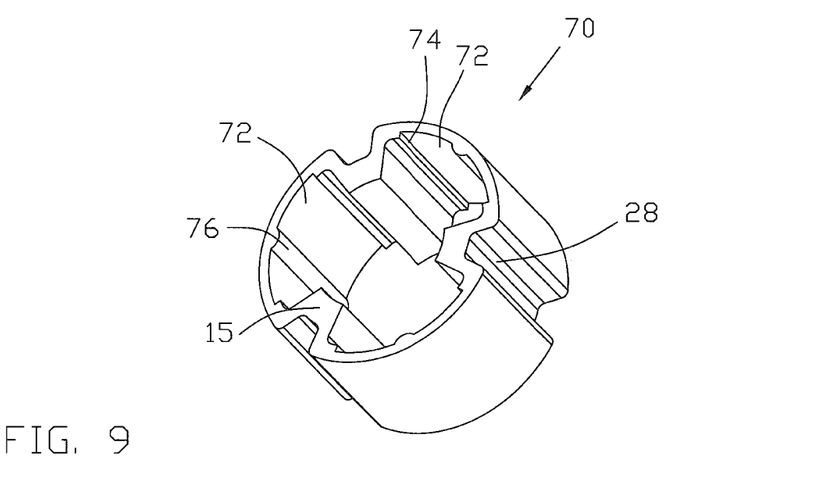
FIG. 9 is a perspective view of a stator ring, being a part of the stator core of FIG. 8.
Figure 10:
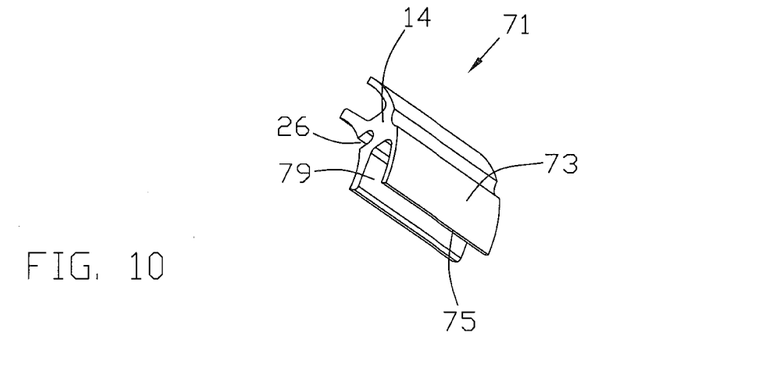
FIG. 10 is a perspective view of a tooth, being a part of the stator core of FIG. 8.

Although the structure of the stator of FIG. 3 provides a much simplified winding, the winding slots can become very full making winding, especially automated winding, difficult or impossible. With this in mind, another embodiment is illustrated in FIGS. 8 to 10. FIG. 8 is a perspective view of the stator core 13, which is formed of four parts, a stator ring 70 as shown in FIG. 9 and three stator plugs 71, as shown in FIG. 10.

The stator ring 70 forms the outer surface of the stator core 13 and is the flux return path. The stator ring 70 also forms the unwound teeth 15. The stator recesses 28 are formed in the radially outer surface at locations corresponding to the unwound teeth 15. Between the unwound teeth on the radially inner surface of the stator ring 70 are seats 72. Each seat has two edges 74 and an axially extending ridge 76.

The stator plugs 71 form the wound teeth 14. Each plug 71 has the wound tooth 14 and a foot 73. The tooth 14 has a pole face with an axially extending groove 26, dividing the tooth into two poles. The foot 73 has edges 75 forms a flange like circumferential extension to the radially outer side of the plug, opposite the pole face, and forms with the pole face a winding channel for a coil of the winding. The foot 73 has an axially extending trough 77.

During assembly, each plug 71 is wound with a coil of the stator winding and then assembled to the stator ring 70. Each plug 71 is fitted to the stator ring 70 by locating the foot 73 in the seat 72 with the ridge 76 and the trough 77 keying the two parts together with the seat edge 74 and the foot edge 75 assisting to locate the parts. Optionally, the foot may be a tight fit in the seat to temporarily hold the parts together before final joining, preferably by laser welding or similar. Alternatively, the plug can be form locked to the ring. The ring 70 and the plugs 71 are formed by stamping and stacking laminations of steel, especially electrical steel.

One advantage of this construction is that the winding channel or slots can be filled to a very high fill percentage giving more choices to the motor designer and allowing the possibility of reducing the overall size of the outer diameter of the motor. Another advantage is that the winding gap, i.e. the width of the slot between adjacent pole faces through which the wire must pass in conventional winding methods, can be smaller than the minimum necessary for automated winding methods in conventional stators which allows for further reduction in cogging torque.

Thus the present invention provides a novel construction for a BLDC motor which has embodiments particularly suited to use in a fuel pump. Embodiments of the BLDC motor can achieve a high winding efficiency of up to 0.98. The BLDC motor of the present invention has a simplified stator winding process for a low power BLDC motor. For the fuel pump, the provision of fuel passages and the reduction in cogging torque is considered an advantage. Certain embodiments are ideally suited to mass production, even for motors having a small diameter.

Although the invention is described with reference to one or more preferred embodiments, it should be appreciated by those skilled in the art that various modifications are possible. Therefore, the scope of the invention is to be determined by reference to the claims that follow.

For example, a 4-pole, surface mounted PM (permanent magnet) BLDC rotor is shown, but the invention is also suitable for other variations, such as 6-poles, 8-poles, . . . , 2*m pole (where m is an integer), and inset PM geometry. The invention covers BLDC motors with just with one coil for each phase and is applicable to multi-phase motors, i.e. to motors having 2, 3, 4 or more phases. Therefore this invention is suitable not only for fuel pump applications, but also for other applications.

Figure 12:
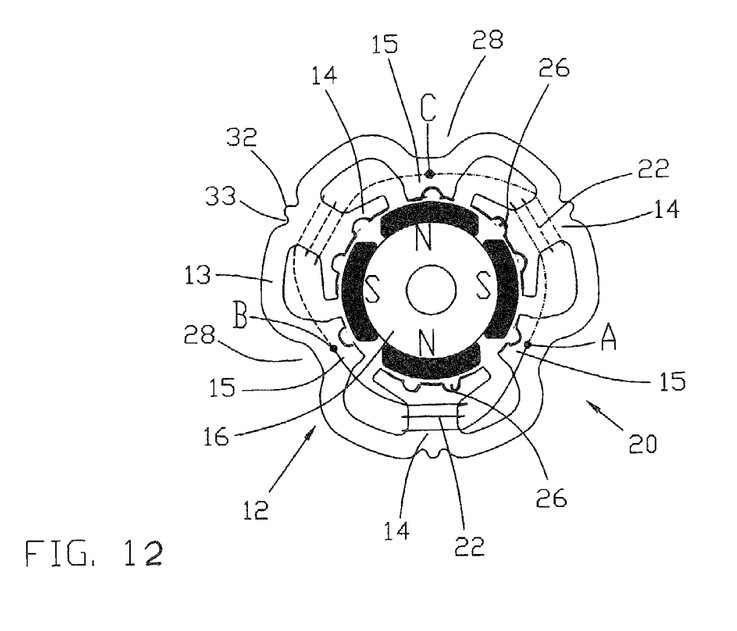
FIG. 12 is a wiring diagram similar to FIG. 11, for a modified stator according to another embodiment of the present invention.

While the preferred embodiments show and describe the axially extending grooves being formed only in the wound teeth of the stator, the unwound teeth may have axial grooves, as well as or instead of the wound teeth, thus forming multiple stator poles in the same way as described for the wound teeth. It is convenient to think of the stator teeth as being divided into two sets, the set of wound teeth and the set of unwound teeth. It is possible for all of the stator teeth to have axially extending grooves to form multiple stator poles and it is possible for each of the unwound teeth to form a different number of stator poles to that of each of the wound teeth. However, it is desired for motor symmetry that each tooth of the same set forms the same number of stator poles. The preferred embodiment is for each tooth of the set of wound teeth to form two stator poles, while each tooth of the set of unwound teeth forms a single stator pole. FIG. 12 illustrates an embodiment in which there are three wound teeth 14 and three unwound teeth 15, with each wound tooth 14 divided into three stator poles by two axially extending grooves 26 and each unwound tooth 15 divided into two stator poles by one axially extending groove 26. Hence the motor is referred to as a three phase, four pole, fifteen slot BLDC motor.

Figure 11:
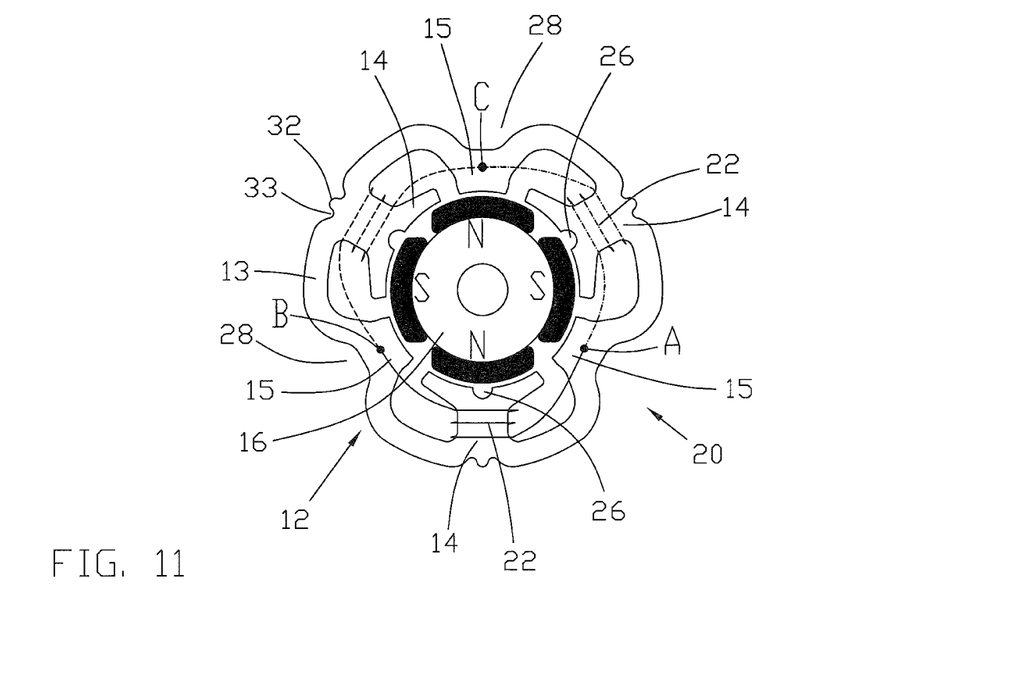
FIG. 11 is a wiring diagram similar to FIG. 5, for a modified stator winding according to another embodiment of the present invention.

While the preferred embodiment shows the stator winding as being connected in Star, in which one end of each coil or phase winding is connected together to form a common point, the stator winding could be connected in Delta. Indeed, a Delta winding configuration does offer some advantages by simplifying the winding connections as shown in FIG. 11. In the Delta configuration of a three phase winding, each phase winding is connected to the other two phase windings. Thus, during winding the wire is connected to a first stator terminal A, wrapped about a first stator tooth to form the first phase winding, connected to a second stator terminal B, wrapped about a second stator tooth to form the second phase winding, connected to a third stator terminal C, wound about a third stator tooth to form the third phase winding and finally connected back to the first stator terminal A. The wire is only cut after being connected to the first stator terminal for the second time, simplifying the winding by eliminating the common Star connection point.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A brushless motor comprising:
a rotor having four permanent magnet rotor poles; and
a stator having six stator teeth and an n-phase stator winding with each leg of the stator winding having a single coil wound about a respective one of the stator teeth, where n is an integer greater than 2,
wherein the stator teeth form wound teeth having a coil there on and unwound teeth having no coil, wherein the wound teeth are alternately spaced with the unwound teeth, and each wound tooth or each unwound tooth or each stator tooth, has at least one axially extending groove formed in a face thereof dividing each said tooth into a plurality of stator poles;
wherein the stator has a core and the core has a radially outer surface having n recesses extending axially of the core, each recess aligned with a respective one of the unwound teeth in a radial direction of the motor, and
the number of the stator poles formed on each wound tooth is two and the number of stator poles formed on each unwound tooth is one and the total number of stator poles is nine.

2. A brushless motor comprising:
a rotor having four permanent magnet rotor poles; and
a stator having six stator teeth and an n-phase stator winding with each leg of the stator winding having a single coil wound about a respective one of the stator teeth, where n is an integer greater than 2,
wherein the stator teeth form wound teeth having a coil there on and unwound teeth having no coil, wherein the wound teeth are alternately spaced with the unwound teeth, and each wound tooth or each unwound tooth or each stator tooth, has at least one axially extending groove formed in a face thereof dividing each said tooth into a plurality of stator poles;
wherein the stator has a core and the core has a radially outer surface having n recesses extending axially of the core, each recess aligned with a respective one of the unwound teeth in a radial direction of the motor, and
wherein the number of stator poles formed on each wound tooth is three and the number of stator poles formed on each unwound tooth is two, and the total number of the stator poles is fifteen.

3. The motor of claim 1, wherein the core is formed from a stack of laminations.

4. The motor of claim 1, wherein the stator core has a stator ring and a number of separately formed stator plugs fixed thereto, each plug forming a wound tooth.

5. The motor of claim 1, wherein the stator winding is encased in a resin material.

6. The motor of claim 1, wherein the stator is overmolded with a plastics material.

7. A fuel pump for an internal combustion engine, incorporating a motor which comprises:
a rotor having 2*m permanent magnet rotor poles, where m is an integer; and
a stator having 2*n stator teeth and an n-phase stator winding with each leg of the stator winding having a single coil wound about a respective one of the stator teeth, where n is an integer greater than 2,
wherein the stator teeth form wound teeth having a coil there on and unwound teeth having no coil, wherein the wound teeth are alternately spaced with the unwound teeth, and each wound tooth or each unwound tooth or each stator tooth, has at least one axially extending groove formed in a face thereof dividing each said tooth into a plurality of stator poles,
wherein the fuel pump has a housing accommodating a pump and the motor, the motor being arranged to drive the pump to cause fuel to flow through the housing, and n passages for the flow of fuel are formed between the stator and the housing, and
wherein the stator has a core which has a radially outer surface having n recesses extending axially of the core, each recess forming at least one portion of a corresponding passage, and
each recess is aligned with a respective one of the unwound teeth in a radial direction of the motor.

8. The fuel pump of claim 7, wherein the stator winding of the motor is encased in a resin material.

9. The fuel pump of claim 7, wherein the stator of the motor is overmolded with a plastics material.

10. A fuel pump for an internal combustion engine, incorporating a motor which comprises:
a rotor having four permanent magnet rotor poles; and
a stator having six stator teeth and an n-phase stator winding with each leg of the stator winding having a single coil wound about a respective one of the stator teeth, where n is an integer greater than 2,
wherein the stator teeth form wound teeth having a coil there on and unwound teeth having no coil, wherein the wound teeth are alternately spaced with the unwound teeth, and each wound tooth has at least one axially extending groove formed in a face thereof dividing each said tooth into a plurality of stator poles, the total number of the stator poles being an odd number,
wherein the fuel pump has a housing accommodating a pump and the motor, the motor being arranged to drive the pump to cause fuel to flow through the housing, and three passages for the flow of fuel are formed between the stator and the housing, and
wherein the stator has a core which has a radially outer surface having three recesses extending axially of the core, each recess forming at least one portion of a corresponding passage and being aligned with a respective one of the unwound teeth in a radial direction of the motor.

11. The fuel pump of claim 10, wherein the total number of the stator poles is nine or fifteen.

12. The fuel pump of claim 10, wherein the stator core comprises a plurality of laminations held together by welding, and the stator is over-molded with a plastic material which forms strips connecting opposite ends of the stator to cover weld portions.

13. The fuel pump of claim 12, wherein small nubs are formed in cutouts in the outer surface of the stator core, the nubs forming the weld portions and the cutouts being filled with the plastic material.

* * * * *